(12) United States Patent
Park et al.

(10) Patent No.: US 8,279,146 B2
(45) Date of Patent: Oct. 2, 2012

(54) LIQUID CRYSTAL DISPLAY DEVICE AND MOBILE COMMUNICATION TERMINAL HAVING THE SAME

(75) Inventors: Tae Bong Park, Gumi-si (KR); Seung Man Jeong, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 983 days.

(21) Appl. No.: 11/720,225

(22) PCT Filed: Jun. 30, 2006

(86) PCT No.: PCT/KR2006/002562
§ 371 (c)(1),
(2), (4) Date: May 25, 2007

(87) PCT Pub. No.: WO2007/004819
PCT Pub. Date: Jan. 11, 2007

(65) Prior Publication Data
US 2008/0014994 A1 Jan. 17, 2008

(30) Foreign Application Priority Data
Jun. 30, 2005 (KR) .................. 10-2005-0058402

(51) Int. Cl.
*G09G 3/36* (2006.01)
*G02F 1/1333* (2006.01)
*G02F 1/1345* (2006.01)
*H04M 9/00* (2006.01)
*H04M 1/00* (2006.01)
*H04B 1/38* (2006.01)

(52) U.S. Cl. ............ 345/87; 349/58; 349/149; 379/429; 379/433.01; 379/433.04; 379/433.13; 455/566; 455/575.1

(58) Field of Classification Search ............... 455/566, 455/575, 3; 379/429, 433.01, 433.04, 433.13; 29/832–841; 349/58, 149
See application file for complete search history.

(56) References Cited

U.S. PATENT DOCUMENTS

| | | | |
|---|---|---|---|
| 3,990,000 A * | 11/1976 | Digneffe | 361/3 |
| 6,493,198 B1 * | 12/2002 | Arledge et al. | 361/56 |
| 6,847,417 B2 * | 1/2005 | Kim | 349/58 |
| 7,069,043 B2 * | 6/2006 | Sawamura et al. | 455/550.1 |
| 7,119,285 B2 * | 10/2006 | Kim et al. | 174/254 |
| 7,489,520 B2 * | 2/2009 | Ha | 361/777 |
| 2001/0046016 A1 * | 11/2001 | Park et al. | 349/139 |
| 2004/0233372 A1 * | 11/2004 | Park | 349/149 |
| 2004/0239832 A1 * | 12/2004 | Saito | 349/74 |
| 2006/0055841 A1 * | 3/2006 | Keski-Opas | 349/58 |

FOREIGN PATENT DOCUMENTS

| | | |
|---|---|---|
| CN | 1310578 A | 8/2001 |
| CN | 1365220 A | 8/2002 |
| CN | 1550830 A | 12/2004 |

(Continued)

*Primary Examiner* — Bipin Shalwala
*Assistant Examiner* — Ryan A Lubit
(74) *Attorney, Agent, or Firm* — Birch, Stewart, Kolasch & Birch, LLP (57) ABSTRACT

An LCD device is provided. The LCD device includes a liquid crystal display panel for displaying an image, a PCB (printed circuit board) where a driver circuit driving the liquid crystal display panel is formed and having an outer portion extending a predetermined length and width to provide a ground region, and a chassis where the PCB is located and electrically connected to the ground region.

9 Claims, 11 Drawing Sheets

FOREIGN PATENT DOCUMENTS

| | | |
|---|---|---|
| JP | 10-268272 A | 10/1998 |
| JP | 2002-232556 A | 8/2002 |
| JP | 2003-066483 A | 3/2003 |
| JP | 2004-348129 A | 12/2004 |
| KR | 10-1998-067764 A | 10/1998 |
| KR | 10-2003-0031336 A | 4/2003 |

* cited by examiner

| Air | EMBOSS (3M) | | COPPER (3M) | | GOLD COLOR (3M) | | SILVER COLOR (3M) | | JOINSET | | |
|---|---|---|---|---|---|---|---|---|---|---|---|
| 22kV | OK | OK | NG | NG | OK | NG | OK | NG | OK | OK | OK |
| 23kV | NG | OK | OK | - | - | NG | OK | NG | OK | NG | NG |

(b)

| Contact | EMBOSS (3M) | | COPPER (3M) | | GOLD COLOR (3M) | | SILVER COLOR (3M) | | JOINSET | | |
|---|---|---|---|---|---|---|---|---|---|---|---|
| 18kV | OK | OK | NG | NG | NG | NG | NG | NG | NG | NG | NG |
| 19kV | NG | NG | NG | NG | NG | NG | NG | NG | NG | NG | NG |

| Air | N COMPANY | | |
|---|---|---|---|
| | FIRST | SECOND | THIRD |
| 20kV | NG | NG | NG |
| 10kV | NG | NG | NG |
| 8kV | OK | OK | OK |
| Contact | N COMPANY | | |
| | FIRST | SECOND | THIRD |
| 8kV | NG | NG | NG |
| 5kV | OK | OK | OK |

(b)

| SAMPLE / MEASUREMENT POINT | #1 | | #2 | | #3 | |
|---|---|---|---|---|---|---|
| | C | A | C | A | C | A |
| | 10kV | 20kV | 10kV | 20kV | 10kV | 20kV |
| ① | OK | OK | OK | OK | OK | OK |
| ② | OK | OK | OK | OK | OK | OK |
| ③ | OK | OK | OK | OK | OK | OK |
| ④ | OK | OK | OK | OK | OK | OK |
| ⑤ | OK | OK | OK | OK | OK | OK |
| ⑥ | OK | OK | OK | OK | OK | OK |
| ⑦ | OK | OK | OK | OK | OK | OK |
| ⑧ | OK | OK | OK | OK | OK | OK |

_US 8,279,146 B2_

LIQUID CRYSTAL DISPLAY DEVICE AND MOBILE COMMUNICATION TERMINAL HAVING THE SAME

CROSS-REFERENCE TO RELATED APPLICATION

This application is the U.S. national stage application of International Patent Application No. PCT/KR2006/002562, filed Jun. 30, 2006, the disclosure of which is hereby incorporated by reference in its entirety.

TECHNICAL FIELD

The present invention relates to a liquid crystal display device and a mobile communication terminal having the same.

BACKGROUND ART

As mobile communication terminals such as personal digital assistants (PDAs), smart phones, cellular phones and music phones are widely used and functions thereof are diversified, a utility range gradually expands.

Generally, as a means for displaying an image, a liquid crystal display (LCD) device is mounted on a mobile communication terminal. Electro-static discharge (ESD) is generated while a product mounting an LCD device thereon is in use. When the ESD is generated, internal devices of a mobile communication terminal are damaged and may not properly operate.

Figure 1:
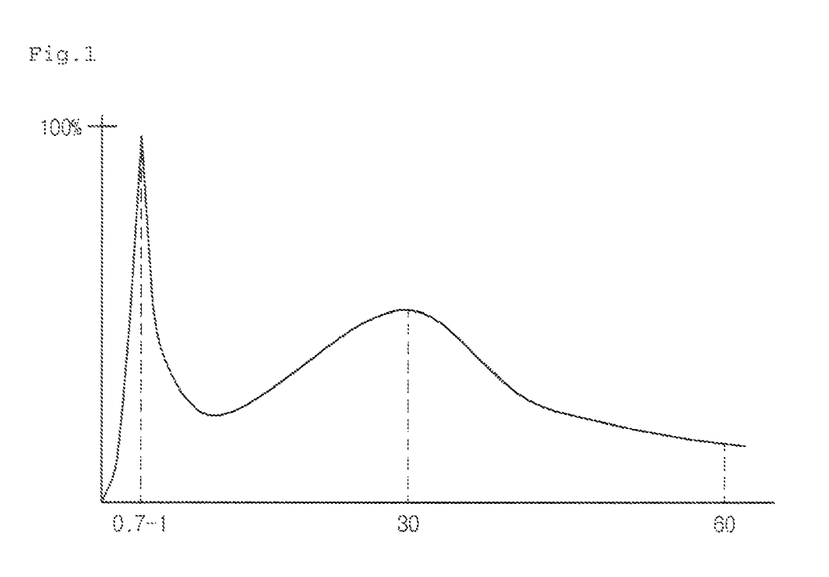
FIG. 1 is a graph illustrating a general waveform of current when the ESD is generated.

FIG. 1 is a graph illustrating a general waveform of current when the ESD is generated.

The ESD means a phenomenon that an electric charge moves between two objects. Referring to FIG. 1, the ESD has a characteristic that a current rapidly rises for less than 1 ns and then is discharged for several tens of ns. An x-axis of a graph illustrated in FIG. 1 is a time (unit: ns) for which a current A is generated, and a y-axis is a relative amount of a current A.

Any exposed portion (e.g., a portion having a structure allowing easy discharge of an electric charge such as a lightning rod) of a mobile communication terminal may serve as a discharge path for the ESD. Also, an electric charge caused by the ESD may be introduced into an inside of a mobile communication terminal, which is not fatal to a human body, though, but damages an electronic product during a manufacturing process of the product or in a field area where the product is actually used, resulting in disorder of the mobile communication terminal.

Figure 2:
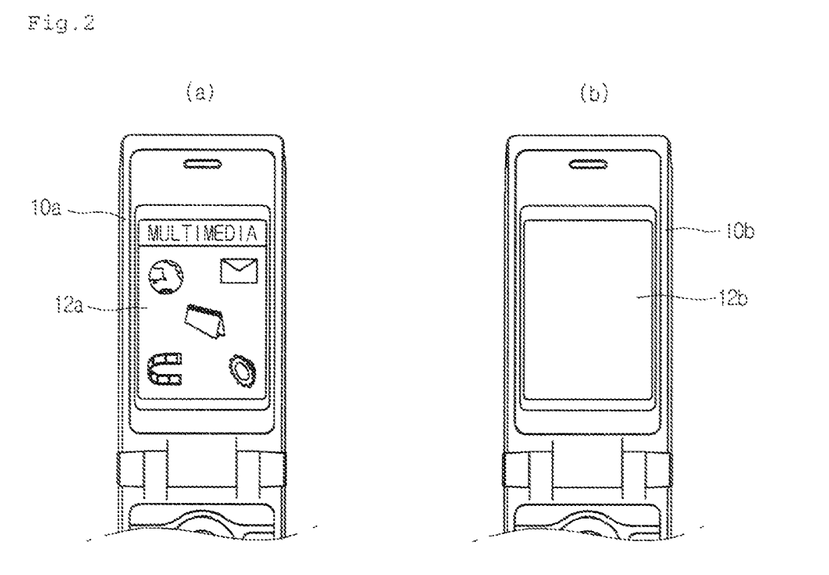
FIG. 2 is a view illustrating an example where a general mobile communication terminal normally operates and an example where a general mobile communication terminal does not normally operate due to ESD.

FIG. 2 is a view illustrating an example where a general mobile communication terminal normally operates and an example where a general mobile communication terminal does not normally operate due to ESD.

Referring to (a) of FIG. 2, the mobile communication terminal 10a normally operates before the ESD is generated. A normal screen 12a is displayed as illustrated.

On the other hand, referring to (b) of FIG. 2, the mobile communication terminal 10b does not normally operate when the ESD is generated. Only an initial screen 12b is displayed instead of the normal screen as illustrated. The shown abnormal operation of the screen 12b is generally called "white screen state".

The "white screen state" means that operations of respective parts of an LCD device are suspended as ESD is generated, and the LCD device is switched into a state where only power is applied. At this point, a user should initialize power in order to restore the mobile communication terminal to its normal state.

However, besides the "white screen state" when internal elements of an LCD device are damaged by the ESD, the mobile communication terminal may not operate eternally.

Figure 3:
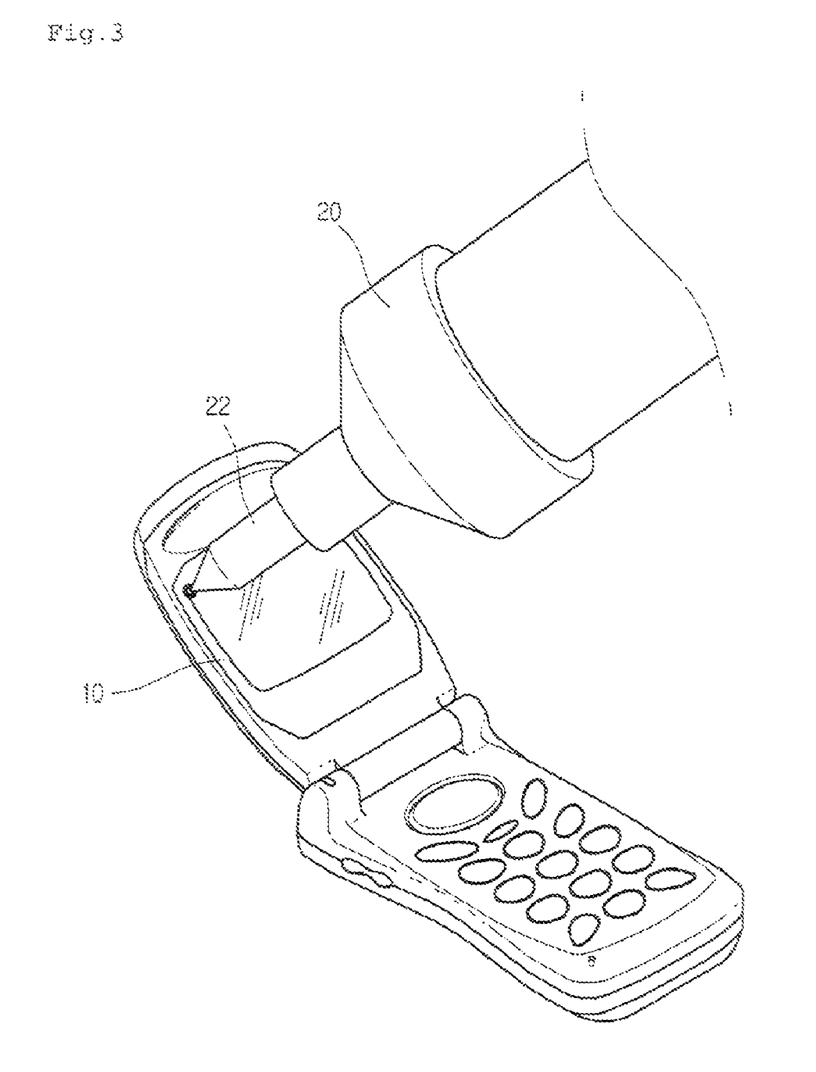
FIG. 3 is a view illustrating an example where an ESD endurance test is performed using an ESD experiment apparatus.
Figure 4:
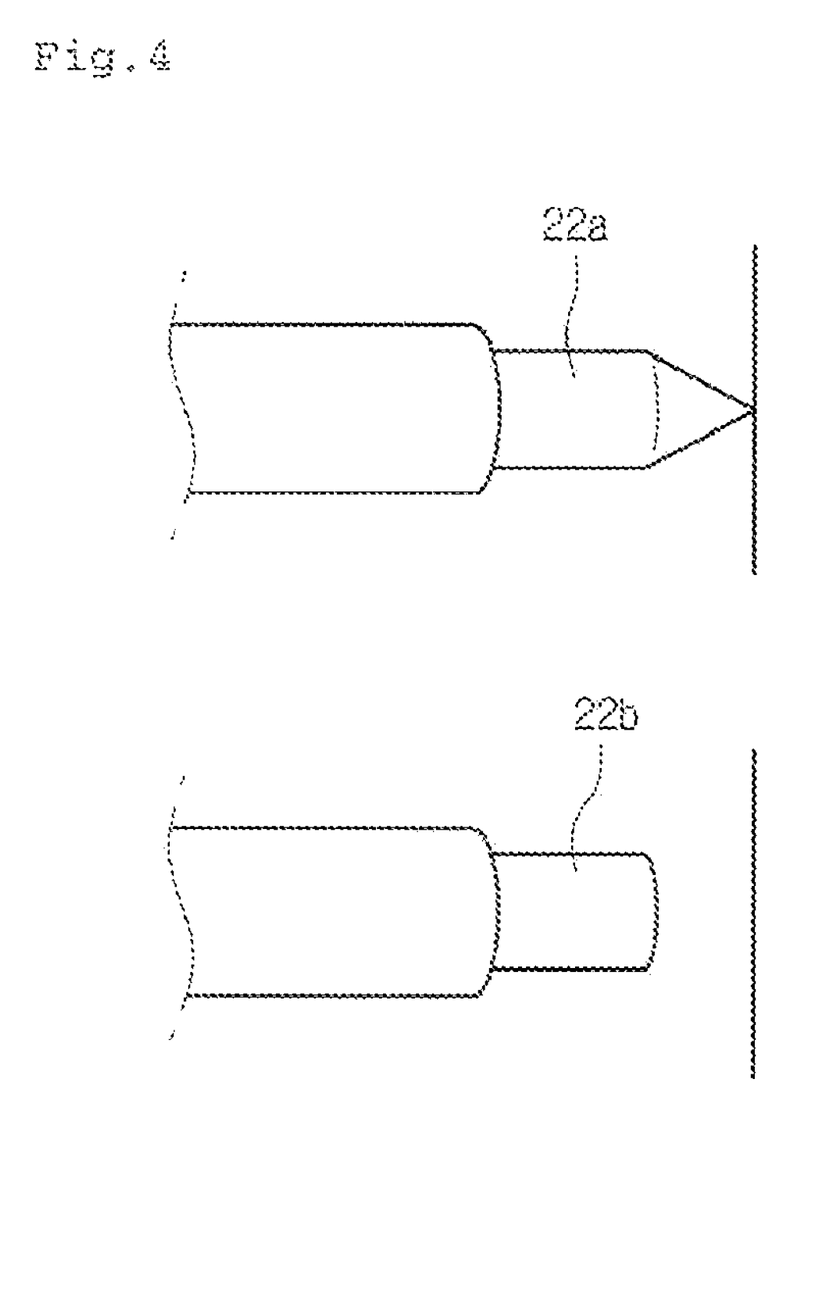
FIG. 4 is a view illustrating an example where kinds of a discharge tip used for an ESD gun.

FIG. 3 is a view illustrating an example where an ESD endurance test is performed using an ESD experiment apparatus, and FIG. 4 is a view illustrating an example where kinds of a discharge tip used for an ESD gun.

As an example of the ESD test, charges existing on a portion of a display window of a mobile communication terminal 10 are artificially discharged using the ESD gun 20 having the discharge tip 22 with a predetermined voltage as illustrated in FIG. 3. Here, functions of the mobile communication terminal 10 are checked. The artificial discharging is performed using an air type ESD test and a contact type ESD test. Referring to FIG. 4, different kinds of discharge tips 22a and 22b are used depending on whether the ESD test is the contact type ESD ((a) of FIG. 4) test or the air type ESD test((b) of FIG. 4).

At this point, the discharge tip 22a or 22b is perpendicularly positioned on a case surface of the mobile communication terminal 10, and a resistor having resistance of about 940 kΩ is connected between the mobile communication terminal 10 and the ground. Also, the mobile communication terminal 10 should be located on a discharge board. In the case of the air type ESD test, the discharge tip 22b is closely located on a test point and shot-discharged one time. In the case of the contact type ESD test, the discharge tip 22a contacts a test point and shot-discharged one time.

Currently, when the above-described endurance test is performed on LCD device products by an N company and a T company, which are widely used among the public, the white screen state is generated at a voltage of about 8 kV in the case of the air type ESD and a voltage of about 5 kV in the case of the contact type ESD.

According to such test results, products are under a great influence of the ESD during a manufacturing process of the products or in a field area where the products are actually used. Therefore, development of an LCD device having enhanced ESD durability is highly required.

DISCLOSURE OF INVENTION

Technical Problem

The present invention provides an LCD device and a mobile communication terminal having the same, capable of achieving enhanced durability against a high ESD voltage.

Technical Solution

The present invention provides an LCD device including: a liquid crystal display panel for displaying an image; a printed circuit board (PCB) where a driver circuit driving the liquid crystal display panel is formed, and having an outer portion extending a predetermined length and width to provide a ground region; and a chassis where the PCB is located and electrically connected with the ground region.

The present invention provides a mobile communication terminal including: an LCD device including a liquid crystal display panel for displaying an image, a printed circuit board (PCB) where a driver circuit driving the liquid crystal display panel is formed and having an outer portion extending a predetermined length and width to provide a ground region, and a chassis where the PCB is located and electrically connected with the ground region; a communication element performing communication with the outside; and a control unit controlling the communication element and image displaying by the LCD.

Advantageous Effects

According to the present invention, an internal circuit contained in a product is protected against a high voltage of about 22 kV in the case of the air type ESD and a high voltage of about 15 kV in the case of the contact type ESD, so that durability of the product can be enhanced.

BRIEF DESCRIPTION OF THE DRAWINGS

In FIGS. 13 and 14, the term "NG" stands for "not good" and the term "OK" stand for an acceptable low ESD discharge.

MODE FOR THE INVENTION

Hereinafter, embodiments of the present invention will be described in detail with reference to accompanying drawings.

In embodiments of the present invention, descriptions will be made using a folder type cellular phone for an example of a mobile communication terminal. However, a mobile communication terminal of the present invention is not limited to the folder type cellular phone but includes a portable terminal having a voice communication element and a portable terminal having a data communication element. A mobile communication terminal of the present invention includes a portable terminal having an LCD device as an image display element.

Figure 5:
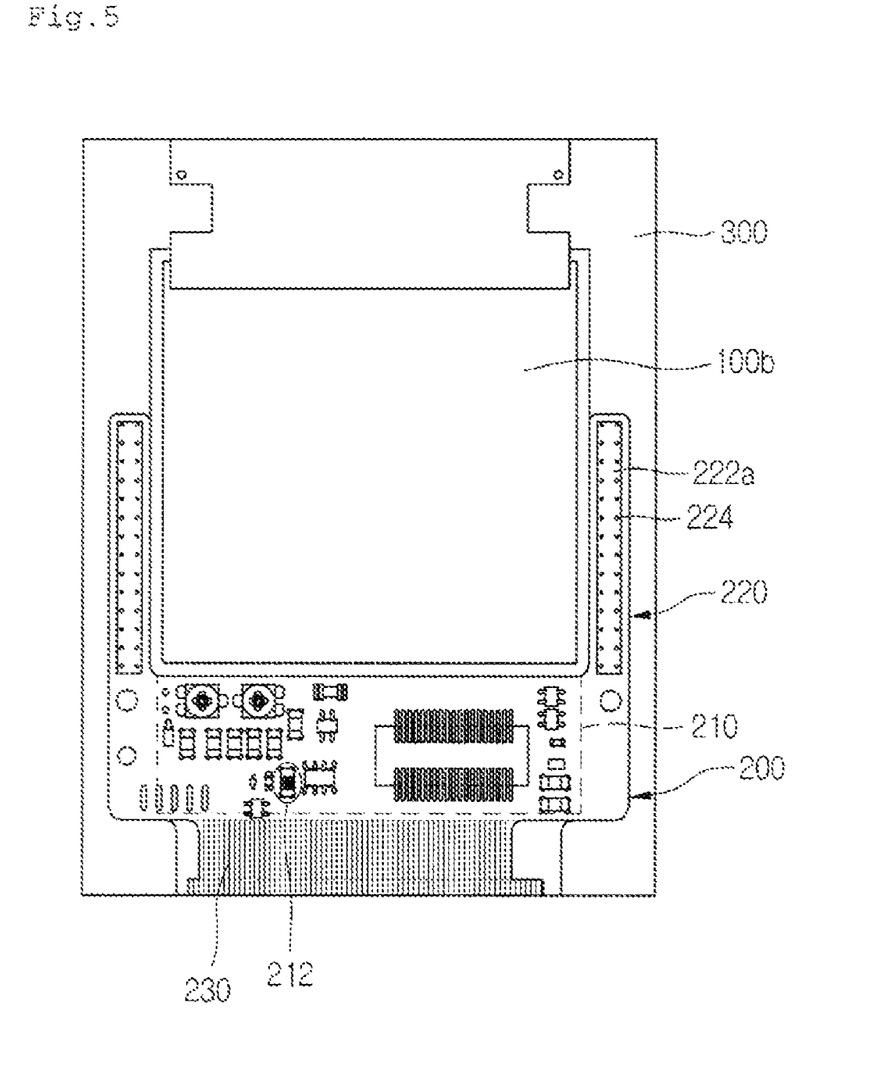
FIG. 5 is a view illustrating a portion of a mobile communication terminal having an LCD device according to an embodiment of the present invention.
Figure 6:
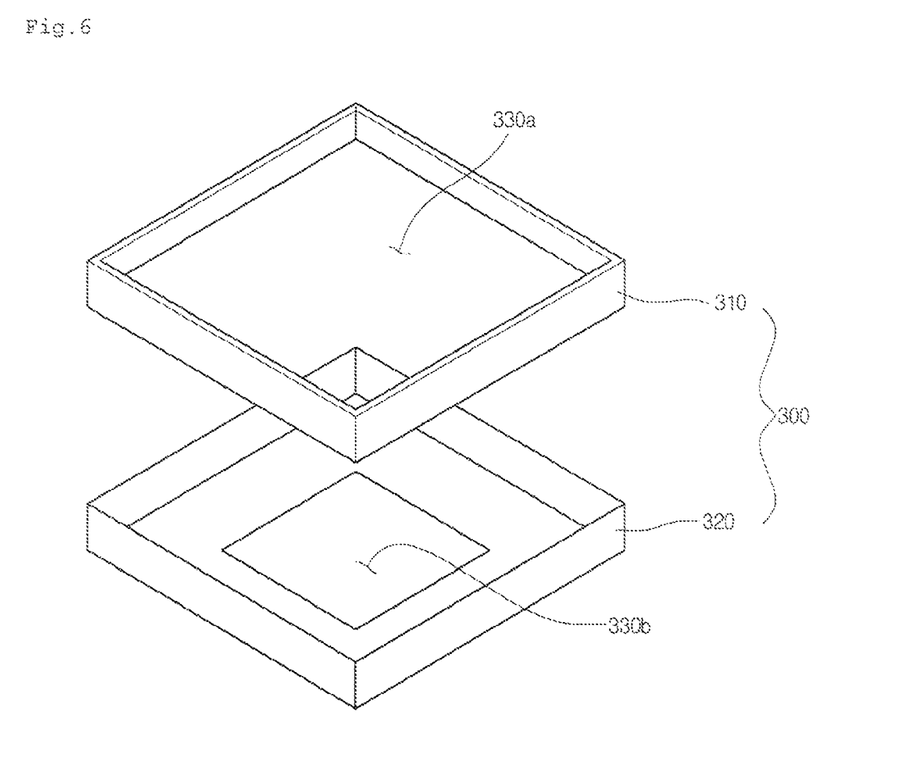
FIG. 6 is a view illustrating a structure of a chassis of an LCD device according to an embodiment of the present invention.
Figure 7:
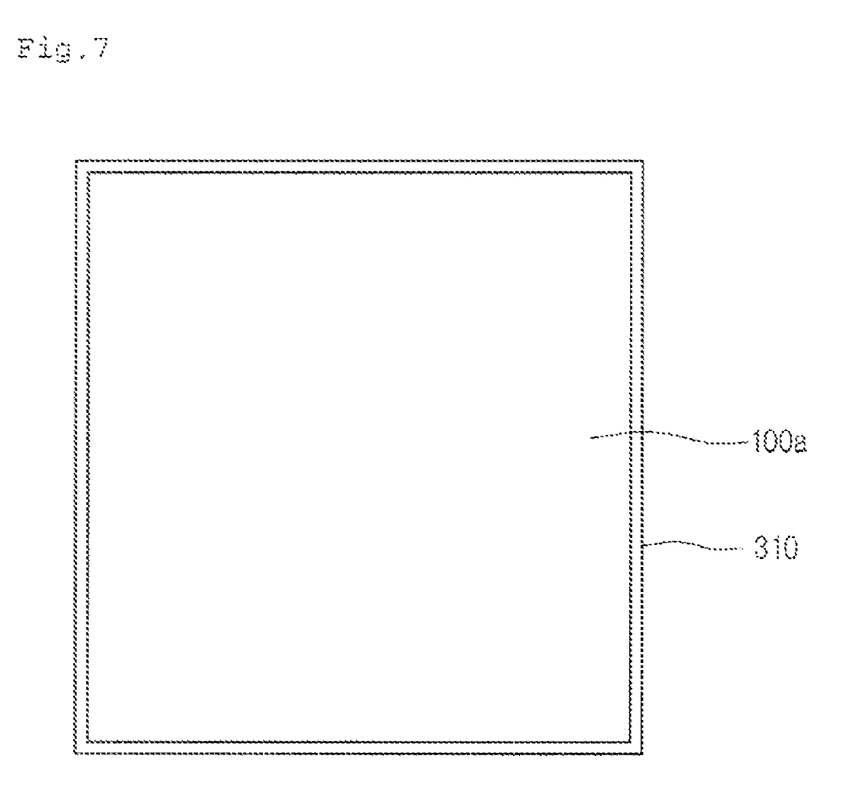
FIG. 7 is a front view of a main liquid crystal display panel of an LCD device according to an embodiment of the present invention.

FIG. 5 is a view illustrating a portion of a mobile communication terminal having an LCD device according to an embodiment of the present invention, FIG. 6 is a view illustrating a structure of a chassis of an LCD device according to an embodiment of the present invention, and FIG. 7 is a front view of a main liquid crystal display panel of an LCD device according to an embodiment of the present invention.

In FIG. 5, a liquid crystal display panel 100b, a chassis 300, and a PCB 200 are illustrated as elements of a mobile communication terminal. The liquid crystal display panel 100b, the chassis 300, and the PCB 200 are elements mounted in a folder portion of the folder type cellular phone.

The mobile communication terminal according to the present invention may include a main liquid crystal display panel 100a and a sub liquid crystal display panel 100b. The main liquid crystal display panel 100a and the sub liquid crystal display panel 100b may be the same or different in their size. The chassis 300 may consist of a top chassis 310 and a bottom chassis 320.

The main liquid crystal display panel 100a and the sub liquid crystal display panel 100b are elements for displaying an image and are coupled to the chassis 300. In FIG. 5, the sub liquid crystal display panel 100b coupled to the chassis 300 is illustrated. The PCB 200 is coupled on the chassis 300.

Referring to FIG. 6, the chassis 300 has a structure where quadrangular through portions 330a and 330b are formed in the center, and may consist of the upper chassis 310 and the bottom chassis 320 coupled to each other. Referring to FIG. 7, since the main liquid crystal display panel 100a is coupled to the upper chassis 310, a portion of the top chassis 310 is seen when viewed from a front side.

A driver circuit driving the liquid crystal display panel is formed in the PCB 200. Leg-shaped outer portions 220 extend in parallel at both edges of the PCB 200. The outer portions 220 are formed along a periphery of the sub liquid crystal display panel 100b. An upper ground region 222a is formed in the outer region 220.

The outer portion 220 of the PCB 200 may be formed at a length ranging from 9 mm to 19 mm. Reflecting test results, the outer portion 220 may be formed at a length ranging from about 9.2 mm to 18.35 mm. Also, the outer portion 220 may be formed at a width ranging from 1.8 mm to 2.3 mm.

The PCB 200 may be a flexible PCB. The upper ground region 222a may be formed by partially removing a cover layer of the PCB 200.

At this point, the upper ground region 222a may be formed by partially removing an upper cover layer of the outer portion 220. Also, the upper ground region 222a may be formed by partially removing upper and lower cover layers of the outer portion 220.

A case where the upper ground region 222a is differently formed as descried above will be described later when a conduction coupling structure with the chassis 300 is descried below.

Also, a via hole 224 may be formed in the outer portion 220 of the PCB 200 in order to easily discharge a current caused by ESD. The via hole 224 may be formed at a diameter of 0.2 0.5 mm. The number of via holes 224 corresponding to 8-10% of the number of via holes formed in an entire PCB 200 may be provided in the outer portion 220. For example, about 160 via holes are provided in the entire PCB 200, and generally formed within the ground region.

Modifying a structure design of the ground region 220 and forming the via holes 224 are intended for enhancing a grounding function and thus maximizing a discharge effect of a current caused by ESD compared to the related art.

Also, a varistor device 212 is provided to a circuit unit 210 of the PCB 200 in order to cut off an ESD current flowing through a circuit device. The varistor device 212 is a kind of a variable resistor absorbing an excessive voltage when the excessive voltage greater than a predetermined voltage is generated inside a circuit to protect the circuit. The varistor device 212 is located at a reset terminal of the circuit unit 210. The varistor device 212 is manufactured using a technology related to stacked parts such as a chip condenser and a ceramic semiconductor material technology.

The PCB 200 includes a connection unit 230 connected to electronic circuits contained in a main machine of a mobile communication terminal according to the present invention. The ground region of the PCB 200 may extend up to a region where the connection unit 230 in order to maximize discharge of an ESD current.

On the other hand, the chassis 300 is electrically connected to the upper ground region 222a formed by removing a portion of an upper cover layer of the PCB 200. Accordingly, the chassis 300 may block a path through which an ESD current is directly delivered to the liquid crystal display panel.

Figure 8:
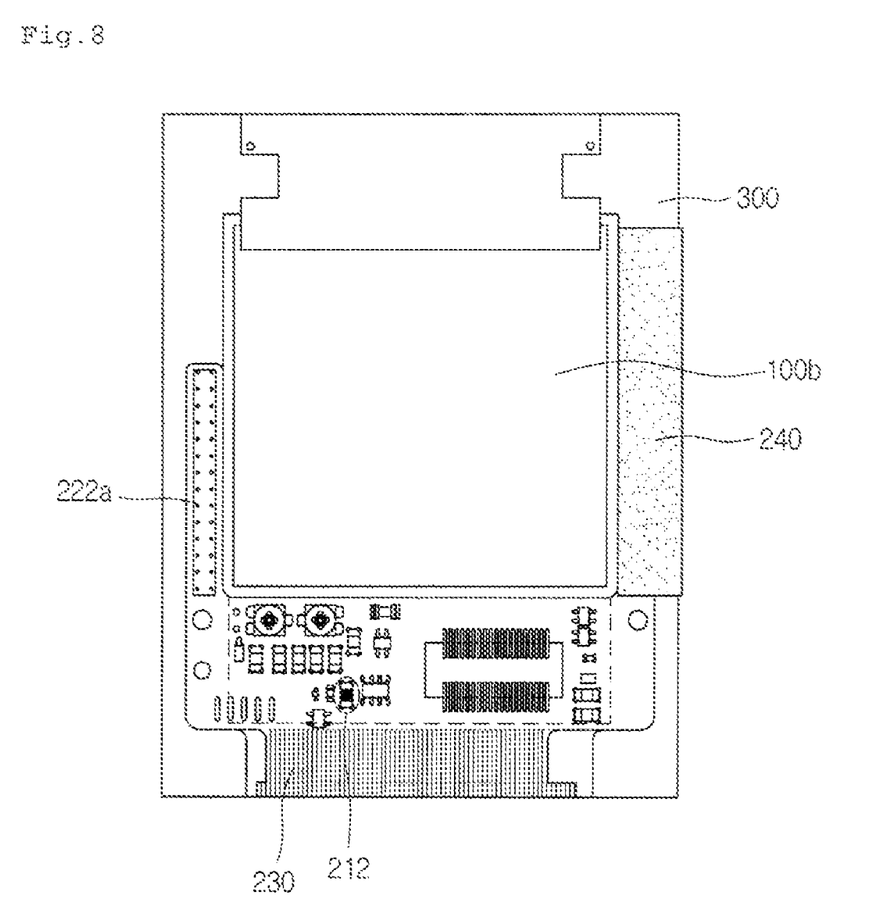
FIG. 8 is a front view illustrating that a chassis of an LCD device according to an embodiment of the present invention is electrically conducted to a ground region of a PCB.
Figure 9:
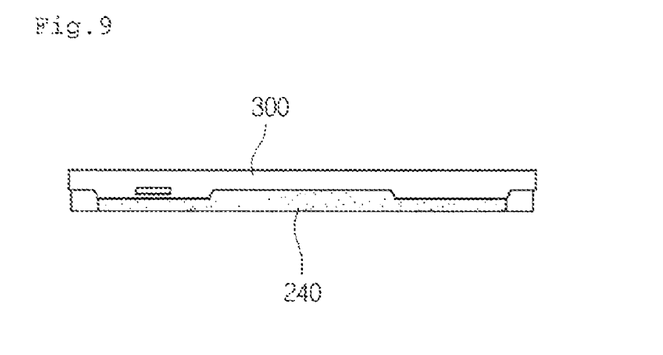
FIG. 9 is a side view illustrating that a chassis of an LCD device according to an embodiment of the present invention is electrically conducted to a ground region of a PCB.

FIG. 8 is a front view illustrating that a chassis of an LCD device according to an embodiment of the present invention is electrically conducted to a ground region of a PCB, and FIG. 9 is a side view illustrating that a chassis of an LCD device according to an embodiment of the present invention is electrically conducted to a ground region of a PCB.

Referring to FIGS. 8 and 9, the upper ground region 222a is formed by removing a portion of a cover layer of the PCB. Also, the upper ground region 222a and the chassis 300 are electrically connected through a conductive tape 240. Here, a lower ground region may be further formed on a lower portion of the outer portion.

In an embodiment of the present invention, the chassis 300 may consist of the top chassis 310 and the bottom chassis 320 as described above. The lower chassis 320 is coupled to the top chassis 310. Since the chassis 300 is electrically connected to the ground region 222, an ESD current cut-off function may be enhanced even more.

Figure 10:
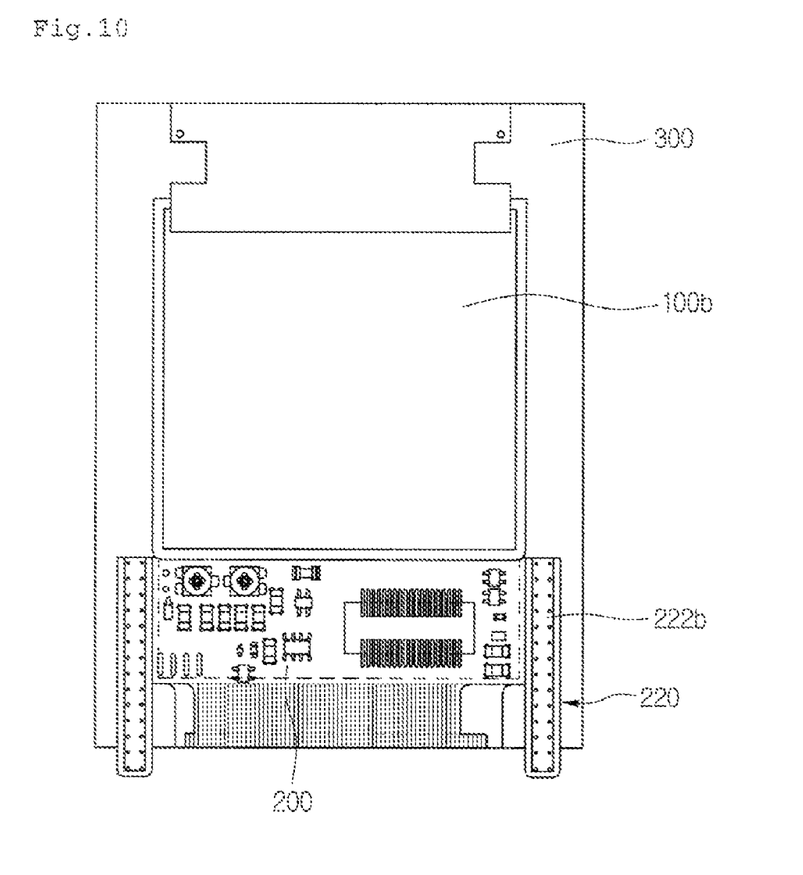
FIG. 10 is a view a lower ground region is formed in a lower surface region of a PCB in an LCD device according to an embodiment of the present invention.

FIG. 10 is a view a lower ground region is formed in a lower surface region of a PCB in an LCD device according to an embodiment of the present invention.

Referring to FIG. 10, an outer portion 220 of a PCB 200 is separated from a chassis 300 and formed on a rear side. A lower ground region 222b is formed by partially removing a lower cover layer of the outer portion 220.

Here, unlike the embodiment described with reference to FIGS. 8 and 9, a conductive tape is located below the outer portion 220. Accordingly, the chassis 300 can be electrically connected to the lower ground region 222b of the PCB 200.

Referring to FIG. 10, since the lower ground region 222b located in the outer region 220 of the PCB 200 is coupled to the chassis 300 from a lower side, the conductive tape is not seen when viewed from a front side.

Two examples where the chassis 300, the ground regions 222a and 222b, and the liquid crystal display panel 100b are electrically connected through the conductive tape have been described with reference to FIGS. 8 to 10. At this point, the chassis 300, the ground regions 222a and 222b are coupled on a surface of a region where a liquid crystal inlet of the liquid crystal display panel 100b is not located.

Figure 11:
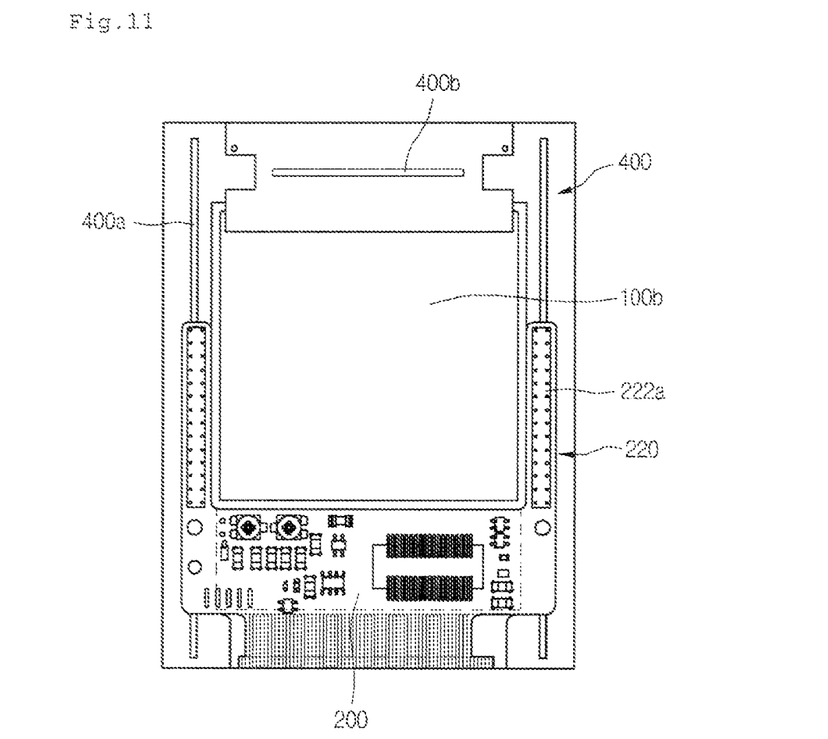
FIG. 11 is a front view illustrating a line groove is formed in a chassis in an LCD device according to an embodiment of the present invention.

Also, the chassis 300 coupled to the liquid crystal display panel 100b may be damaged when the chassis 300 is broken or warped due to external impulse such as falling down. It is possible to minimize such damage by forming a line groove 400 in a surface of the chassis 300. FIG. 11 is a front view illustrating a line groove is formed in a chassis in an LCD device according to an embodiment of the present invention.

Referring to FIG. 11, one line groove 400b is formed in an upper surface of surfaces of the chassis 300 where the PCB 200 is coupled, and one or more line grooves 400a are formed in each of lateral surfaces of the surfaces of the chassis 300. With such a structure, the chassis 300 has durability against external impulse.

A degree ESD durability is enhanced through the structure of the LCD device according to the present invention will be checked using test analysis results below.

An ESD durability test has been performed under the following conditions.

First, the ESD durability test has been performed for an air type discharge and a contact type discharge.

Second, three products from the N company and three products according to the present invention have been used for samples of an LCD device. One discharge has been performed on each of the samples.

Third, measurement standards (passing references) are 20 kV for the air type discharge and 10 kV for the contact type discharge.

Figure 12:
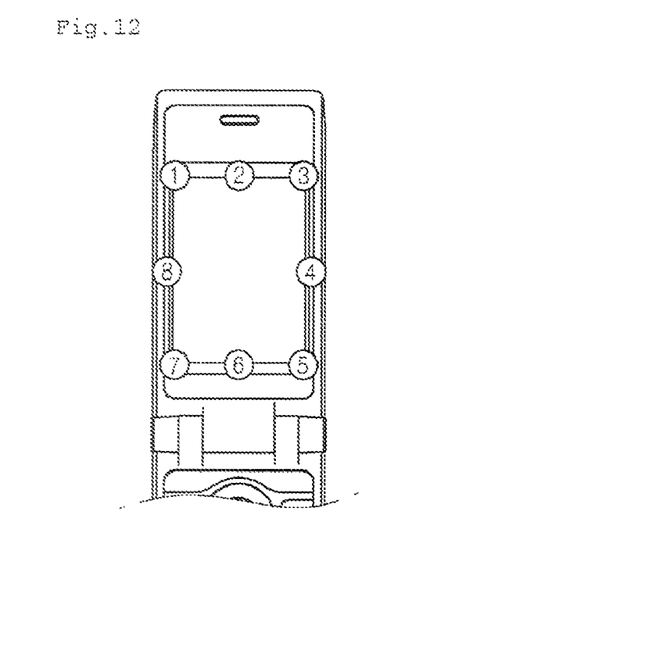
FIG. 12 is a view illustrating eight measurement points used when an ESD durability test is performed on a mobile communication terminal that uses an LCD device according to an embodiment of the present invention.

Fourth, eight points closely located to a liquid crystal display panel window within a folder unit of a folder type mobile communication terminal are selected for measurement points, and one time discharge has been performed for the eight points. FIG. 12 is a view illustrating eight measurement points used when an ESD durability test is performed on a mobile communication terminal that uses an LCD device according to an embodiment of the present invention.

Fifth, the test has been separately performed for a case where structures of the PCB and the ground region are modified and a varistor device is provided, and for a case where the chassis is coupled using the conductive tape.

Sixth, the test has been performed for each kind of the conductive tapes.

Seventh, whether white screen state of the LCD device is generated has been used as the passing references of the test.

Figure 13:
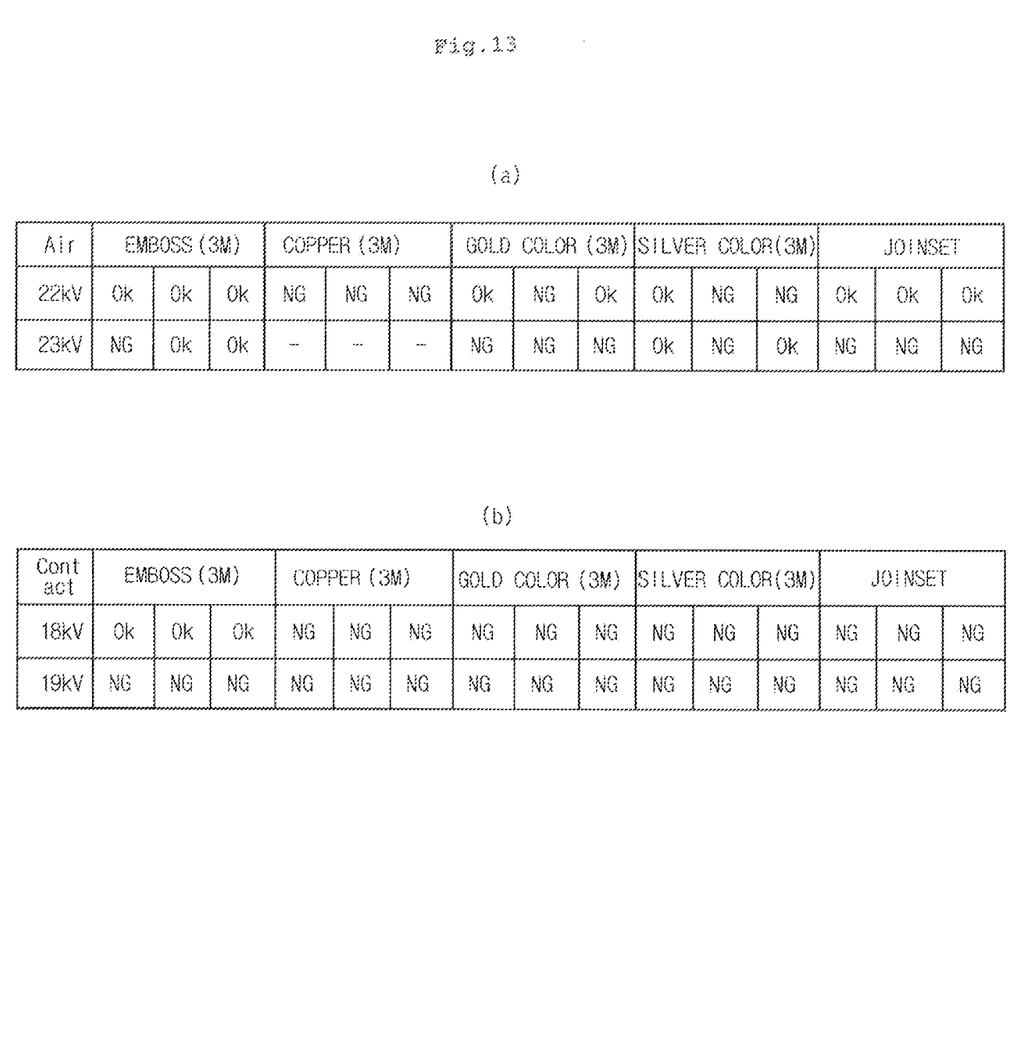
FIG. 13 is a view summarizing test results according to a conductive tape used for an LCD device according to an embodiment of the present invention.

FIG. 13 is a view summarizing test results according to a conductive tape used for an LCD device according to an embodiment of the present invention.

Referring to FIG. 13, the conductive tape includes embossing type, copper film type, gold color type, silver color type, and joinset type tapes. When ESD voltages of 18 kV and 19 kV are applied during the contact type discharge, the white screen state is generated from the conductive tape such as the copper film type, gold color type, silver color type, and joinset type tapes.

Similarly, in the case of the air type discharge, the white screen state is irregularly generated except for the embossing type tape. Therefore, according to the test results, the embossing type tape may be used for an LCD device according to an embodiment of the present invention.

Figure 14:
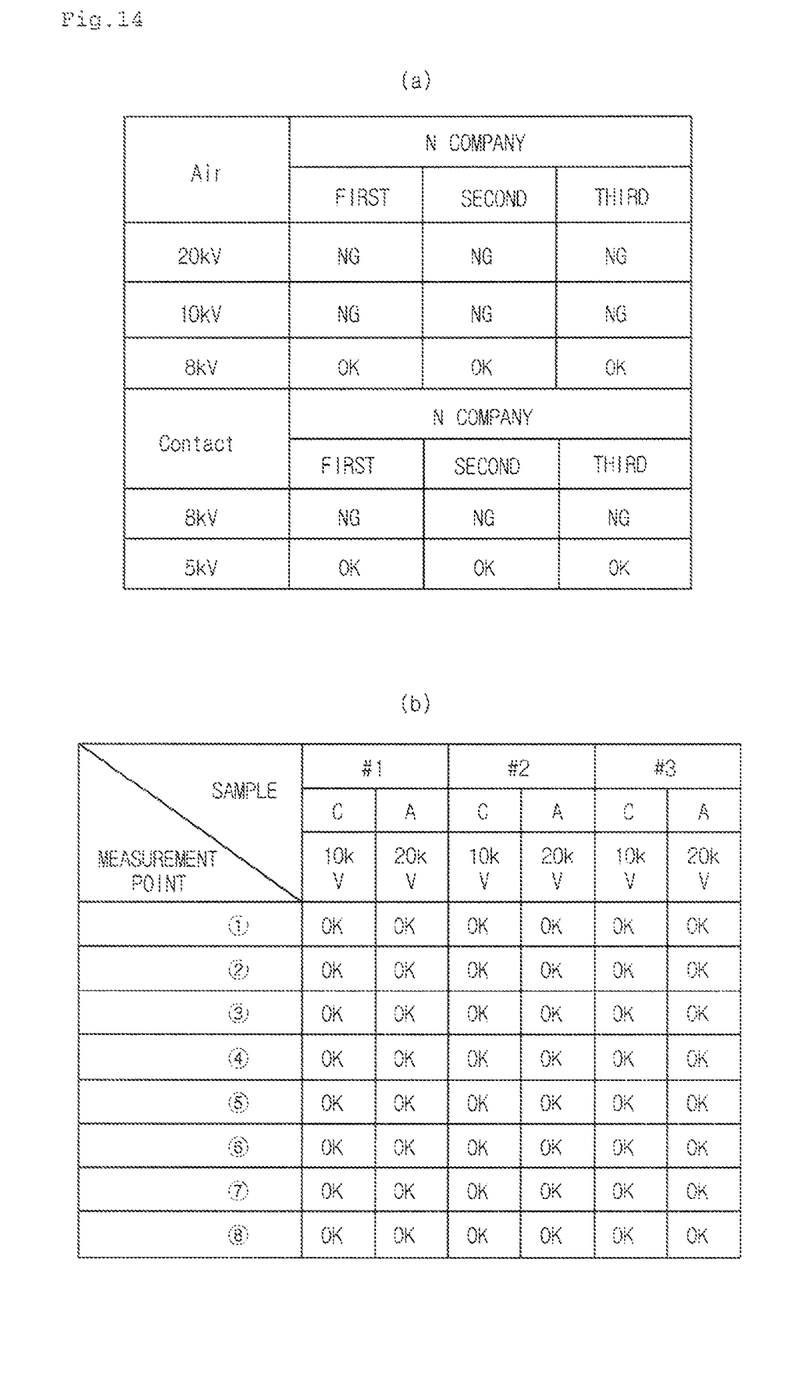
FIG. 14 is a view summarizing general test results of an LCD device having enhanced ESD durability according to an embodiment of the present invention.

FIG. 14 is a view summarizing general test results of an LCD device having enhanced ESD durability according to an embodiment of the present invention.

Referring to FIG. 14, an LCD device according to the present invention does not generate the white screen state for all three tests involving eight points both the air type discharge and the contact type discharge compared to the related art LCD device by the "N" company. Therefore, it is considered that ESD durability has been enhanced. The (a) of FIG. 14 denote the test result for samples of "N" company. And (b) of FIG. 14 denote the test result for samples of the present invention.

Accordingly, an LCD device having enhanced ESD durability according to the present invention can be stably driven under an ESD voltage of even about 22 kV in the case of the air type discharge and under an ESD voltage of even about 15 kV in the case of the contact discharge.

The mobile communication terminal may include the above-described LCD device, a communication element performing communication with the outside, and a control unit controlling the communication element and image displaying by the LCD device.

While the present invention has been described and illustrated herein with reference to the embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

According to an LCD device of the present invention, an internal circuit of the LCD device is protected against a high ESD voltage of about 22 kV in the case of the air type discharge and about 15 kV in the case of the contact discharge, so that durability is enhanced. Therefore, product yield may be increased during a manufacturing process, and the product can stably maintain normal operation and service even when the ESD is generated in a use field.

The invention claimed is:

1. An LCD (liquid crystal display) device comprising:
a liquid crystal display panel for displaying an image;
a PCB (printed circuit board) where a driver circuit driving the liquid crystal display panel is formed, the PCB including a pair of outer portions that extend for a predetermined length and width to provide a ground region thereon, and a circuit unit that extends between the pair of outer portions and is connected to the pair of outer portions, wherein the pair of outer portions are perpendicular to the circuit unit and extend parallel in the same direction and away from the circuit unit; and
a chassis coupled to the liquid crystal display panel, wherein the PCB is located in the chassis and the ground region of the PCB is electrically connected to the chassis,
wherein the pair of outer portions are located adjacent to edge sides of the liquid crystal display panel to guide the liquid crystal display panel in lateral sides,
wherein a plurality of grooves are formed in the chassis, one of the plurality of grooves being formed on the chassis opposite the PCB and remainder of the plurality of grooves being formed on the chassis underneath the pair of outer portions, and
wherein a plurality of via holes are formed in the pair of outer portions of the PCB to discharge a current caused by Electrostatic Discharge.

2. The LCD device according to claim 1, wherein the PCB is a flexible PCB.

3. The LCD device according to claim 1, wherein the ground region is formed on an upper surface and a lower surface of the PCB or only on the upper surface of the PCB.

4. The LCD device according to claim 1, wherein the chassis includes a top chassis and a bottom chassis.

5. The LCD device according to claim 1, wherein the chassis is electrically connected to the ground region formed on an upper surface of the PCB through a conductive material.

6. The LCD device according to claim 1, wherein the chassis is electrically connected to a bottom portion of the ground region formed on upper and lower surfaces of the PCB.

7. The LCD device according to claim 1, further comprising a conductive tape electrically connecting the chassis with the ground region.

8. The LCD device according to claim 1, wherein the chassis is electrically connected to the ground region through a conductive material formed on a surface of a region where a liquid crystal inlet of the liquid crystal display panel is not located.

9. The LCD device according to claim 4, wherein a plurality of liquid crystal display panels are provided, at least one of the liquid crystal display panels is located on the top chassis, and at least one of the liquid crystal display panel is located on the bottom chassis.

* * * * *